LIQUID PRESSURE BRAKING SYSTEMS FOR VEHICLES
Filed May 29, 1963 5 Sheets-Sheet 1
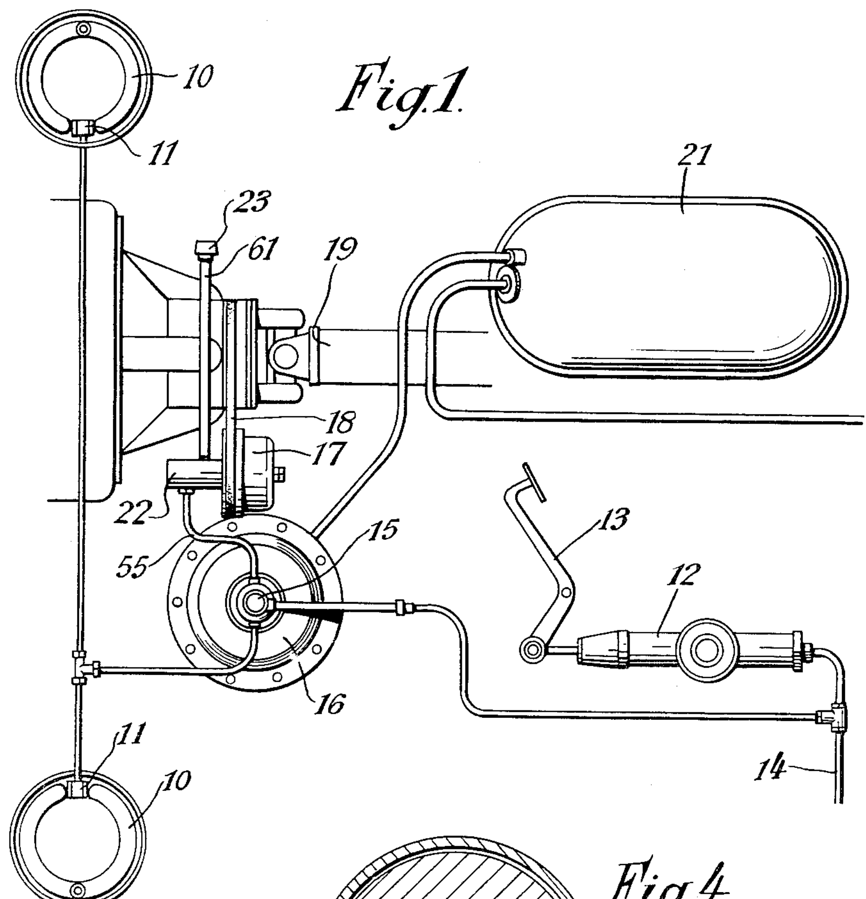
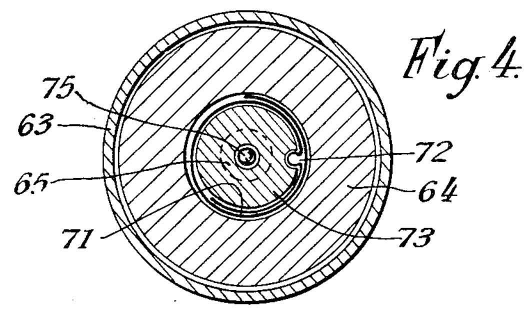
INVENTOR
Mervyn B. Packer
BY Lawrence J. Winter
ATTORNEY

LIQUID PRESSURE BRAKING SYSTEMS FOR VEHICLES

Filed May 29, 1963 5 Sheets-Sheet 2

INVENTOR
Mervyn B. Packer
BY Lawrence J. Winter
ATTORNEY

LIQUID PRESSURE BRAKING SYSTEMS FOR VEHICLES
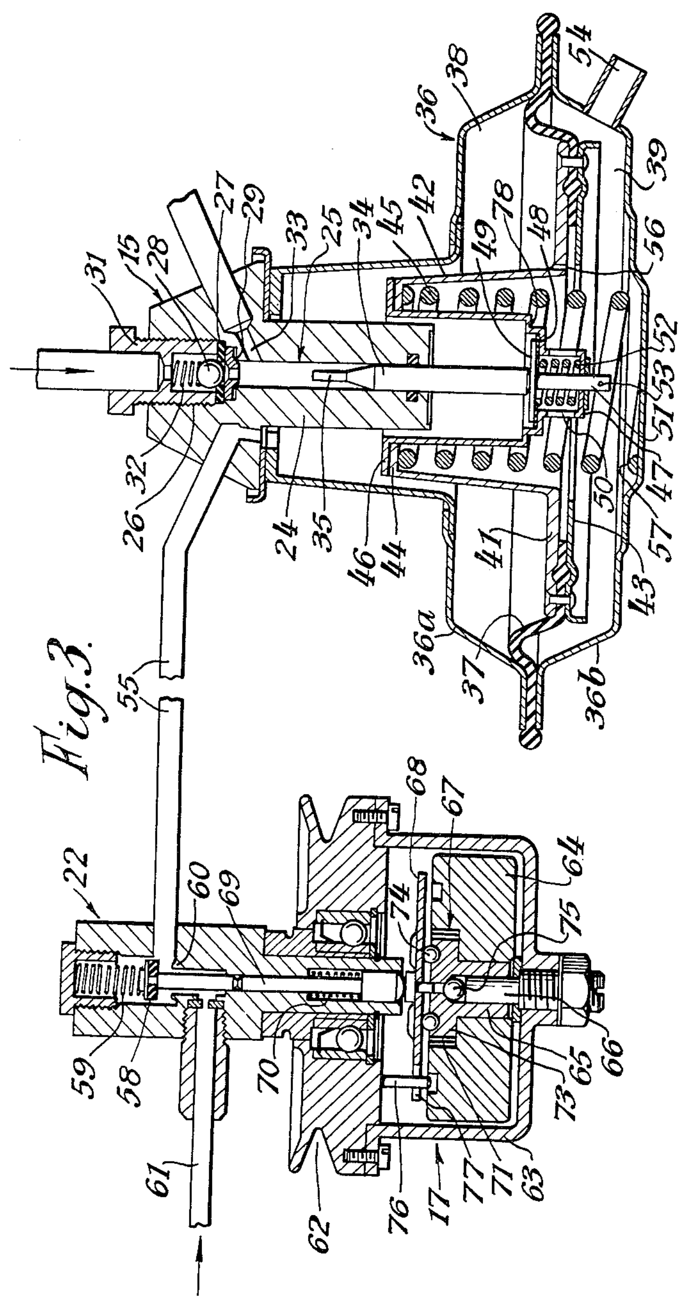
INVENTOR
Mervyn B. Packer
BY Laurence J. Winter
ATTORNEY

LIQUID PRESSURE BRAKING SYSTEMS FOR VEHICLES

Filed May 29, 1963 5 Sheets-Sheet 4

INVENTOR
Mervyn B. Packer
BY Lawrence J. Winter
ATTORNEY

Dec. 14, 1965 M. B. PACKER 3,223,459
LIQUID PRESSURE BRAKING SYSTEMS FOR VEHICLES
Filed May 29, 1963 5 Sheets-Sheet 5
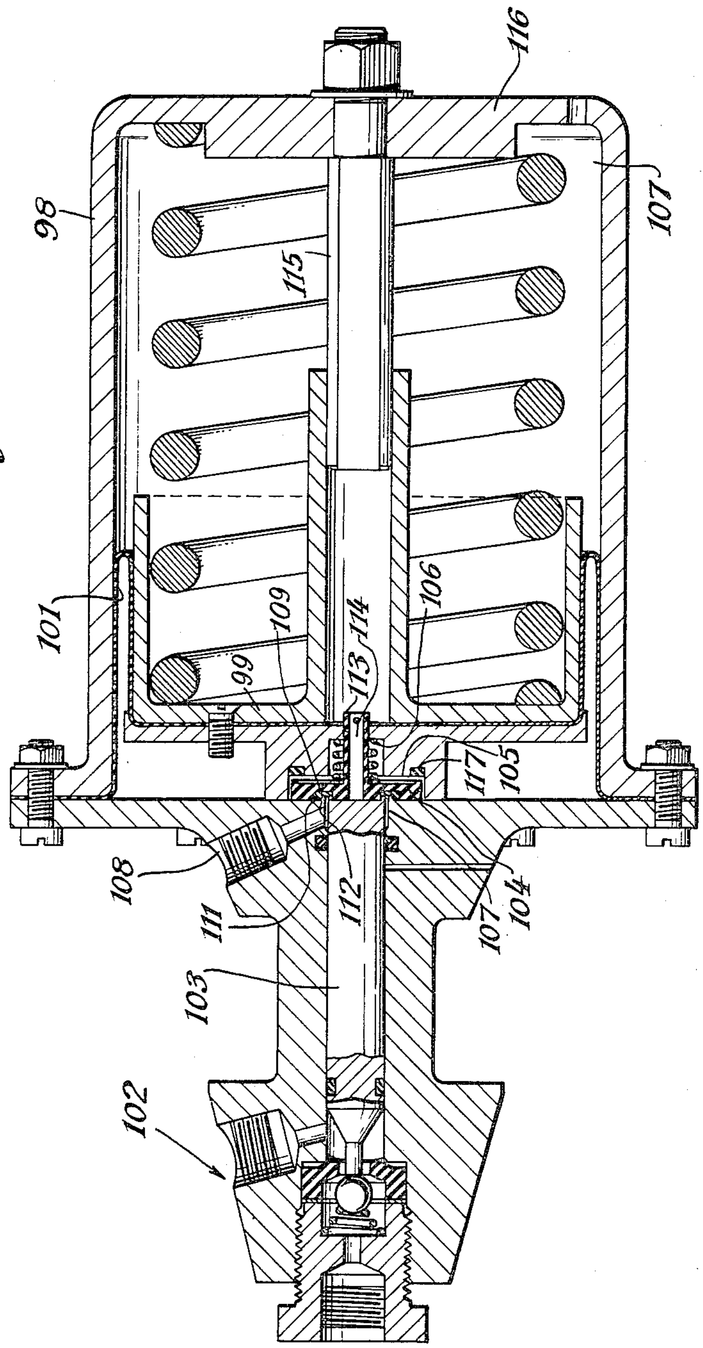
INVENTOR
Mervyn B. Packer
BY Lawrence J. Winter
ATTORNEY 3,223,459
LIQUID PRESSURE BRAKING SYSTEMS FOR VEHICLES Mervyn B. Packer, Leamington Spa, England, assignor to Automotive Products Company Limited, Leamington Spa, England Filed May 29, 1963, Ser. No. 284,032
Claims priority, application Great Britain, June 15, 1962, 23,195/62
4 Claims. (Cl. 303—21)

This invention relates to liquid pressure braking systems for vehicles in which means are provided to reduce automatically the liquid pressure exerted to apply the brake or brakes acting on a wheel or wheels of the vehicle as a result of deceleration of that wheel or wheels at a rate exceeding a predetermined maximum, so that the braking can be relieved to prevent wheel locking and resultant sliding of the vehicle.

In braking systems including such means, it has been proposed to provide a sensing device directly responsive to change in the motion of the wheel or wheels (e.g. rapid deceleration) which is likely to be followed by locking, one example of such a sensing device being a flywheel which is rotated with the wheel or wheels of the vehicle but is free to overrun said wheel or wheels due to its inertia when the said wheel or wheels is braked heavily, the overrunning being used to produce actuation of the means for reducing the braking pressure. In order that the braking pressure on one or more wheels of a vehicle can be reduced independently of the pressure produced in the master cylinder or other pressure producing device of the system, it is necessary to isolate the motor cylinder or cylinders operating the brake or brakes on that wheel or wheels from the said pressure producing device by closing a valve.

Liquid pressure braking systems for vehicles as set forth in the two preceding paragraphs are hereinafter called "liquid pressure braking systems of the kind referred to."

It has been found that when the transmission system of a vehicle is placed under load or relieved of load due to the engagement and release respectively of a clutch in the said system, the torsional deflection in the system frequently causes actuation of the sensing device to close the valve isolating the motor cylinder or cylinders actuating the brakes on the driven wheels from the pressure producing device, with the result that the brakes on those wheels are momentarily rendered inoperable. Whilst the time for which the said brakes are inoperable is very short, it is undesirable that such a condition should arise at all, and it is the object of the present invention to provide an arrangement whereby the closing of the valve due to torsional deflection impulses in the transmission system is avoided.

According to the present invention, in a liquid pressure braking system for a vehicle of the kind referred to, the closing of the valve which isolates the motor cylinder or cylinders from the pressure source depends on the actuation of a fluid pressure servo-device and the said servo-device is operable only when a predetermined pressure exists in the liquid pressure braking system, so that the servo-device operates only during a brake application.

Preferably the servo-device comprises a casing divided into two chambers by a movable wall, a spring in one chamber which acts on the said movable wall in a direction to open the valve, means to maintain that chamber at a predetermined lower pressure and an air valve opened by the sensing device to connect the other chamber to a supply of air at a higher pressure and so to displace the movable wall against the spring and allow the valve to close, means being provided whereby opening of the air valve is effective to cause actuation of the servo-device only during a brake application.

In one way of carrying out the invention, a by-pass valve which connects the chambers on both sides of the movable wall is normally in an open position so that the servo-device is inoperable and is closed by pressure in the liquid pressure braking system to render the servo-device operable.

The invention is hereinafter described with reference to the accompanying drawings, in which:

FIGURE 1 is a general view showing, by way of example, the layout of one form of liquid pressure braking system according to the invention;

FIGURE 3 is a view similar to FIGURE 2 but with the parts in the positions they take up to reduce braking;

FIGURE 4 is a section on the line 4—4 of FIGURE 2;

FIGURE 6 is a sectional elevation of a modified servo-motor unit.

Figure 2:
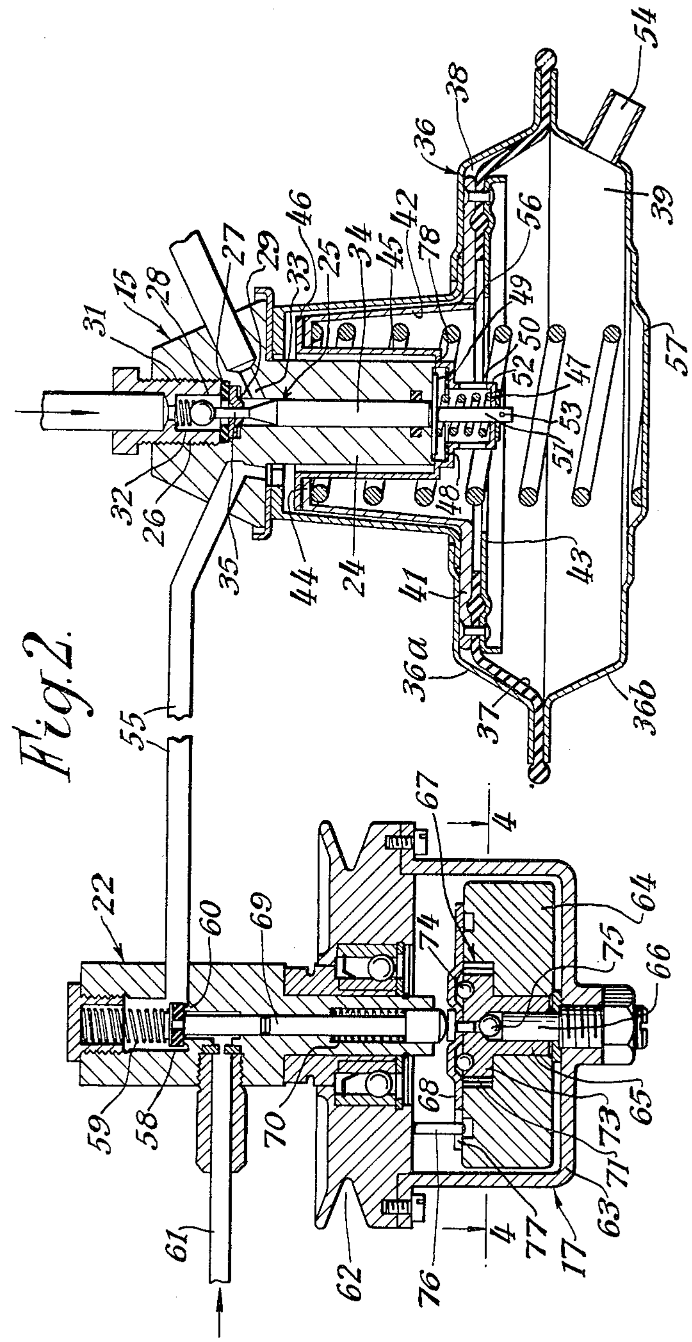
FIGURE 2 is an enlarged sectional view of the sensing device and servo-motor unit shown in FIGURE 1, the parts being in the positions they take up when the sensing device is not subjected to deceleration at a sufficient rate to cause it to respond thereto.

Referring first to FIGURE 1, the rear wheel brakes of a vehicle are shown diagrammatically at 10, liquid pressure motor cylinders 11 for operating the said brakes being connected by a conduit system to a master cylinder 12 operated by a pedal 13, and also connected by a conduit 14 to front wheel brake motor cylinders (not shown). A valve unit 15, hereinafter described, is interposed in the conduit system, and a servo-motor 16 controlling the said valve is itself controlled by a sensing device 17 driven by a belt 18 from the transmission shaft 19 of the vehicle. The servo-motor 16 is connected to a vacuum reservoir 21 evacuated by means (not shown) such as the suction in the inlet manifold of the vehicle engine, and receives atmospheric air through a valve 22 associated with the sensing device 17 and through an inlet filter 23.

The valve unit 15, FIGURES 2 and 3 includes a body 24 formed with a stepped bore 25 the larger end 26 of which is screw-threaded. In the said larger end 26 of the bore is fitted an apertured disc 27 providing a seat for a valve ball 28, the disc 27 being held in position against a shoulder 29 in the bore 25 by a tubular plug 31 defining a cavity in which the valve ball 28 is mounted. A spring 32 urges the valve ball towards its seat to close the aperture in the disc 27. The master cylinder 12 is connected to the tubular plug 31, and a passage 33 in the valve body, leading into the smaller part of the bore 25 adjacent the shoulder 29, is connected to the brake motor cylinders 11.

A plunger 34 slidable in the bore 25 is reduced in diameter at one end to provide a pin 35 passing with substantial clearance through the aperture in the disc 27, the pin being of such a length that it can unseat the ball 28 without its full-diameter portion obstructing the passage 33. A casing 36 forming the body of the servo-motor 16 is fixed to the valve body 24, the casing 36 comprising two parts **36*a* and 36*b* between which is clamped the edge of an annular flexible diaphragm 37 dividing the interior of the casing into two chambers 38 and 39. The inner periphery of the diaphragm 37 is clamped between a flange 41 on a cup-shaped member 42, and a disc 43, the cup-shaped member 42 being apertured at its end 44 to enable it to fit over the valve body 24**.

A second cup shaped member 45 has a flange 46 overlapping the rim surrounding the aperture in the end 44 of the cup shaped member 42, the said member 45 surrounding one end of the valve body 15 and having, at its closed end a stepped hollow extension 47 the intermediate shoulder 48 in which provides a seat for a valve disc 49 adapted, when seated, to shut off from the interior of the member 45 ports 50 in the extension 47 opening into the servo-motor chamber 39. The said member 45 has clearance between its peripheral wall and the valve body 15 so that, when the valve disc 49 is unseated there is free and unrestricted communication between the servo-motor chambers 38 and 39. The valve disc 49 is mounted on a stem 51 guided in the end wall of the extension 47 and is urged away from its seat by a spring 52, its movement away from the seat being limited by a stop pin 53 engaging the exterior of the said end wall. The end of the plunger 34 abuts against the valve disc 49.

The chamber 39 of the servo-motor 16 is connected at 54 to the vacuum reservoir 21, and the chamber 38 is connected to the valve 22 through a conduit 55. A small orifice 56 in the cup-shaped member 42 connects the chambers 38, 39 permanently one to the other.

A coiled compression spring 57 acts on the cup-shaped member 42, and through that cup-shaped member on the cup-shaped member 45 to urge them towards the position shown in FIGURE 2, the spring 52 acting through the valve disc 49 on the plunger 34 to hold the ball valve 28 off its seat.

The valve 22 comprises a closure member 58 urged by a coiled compression spring 59 against a seat 60 to isolate the conduit 55 from a conduit 61 leading to the air inlet at 23.

The sensing device 17 is operated by wheel deceleration and comprises a belt pulley 62 and casing 63 fixed together and rotatable about the body of the valve 22, a flywheel 64 rotatable on a sleeve 65 which is itself in turn rotatable on a stub axle 66 fixed in the casing 63, and a slipping clutch device 67 for transmitting rotation from the pulley 62 to the flywheel 64 through the sleeve 65 and from the flywheel 64 to the sleeve 65. The unit 17 also includes a cam plate 68 moved axially by relative rotational movement of the flywheel 64 and pulley 62 to displace a push-rod 69 acting on the closure member 58 of the valve 22. A spring 70 acts on the push-rod to oppose its movement to unseat the closure member 58.

The slipping clutch device 67, as shown in FIGURE 4, comprises a resilient metal strip 71 anchored at 72 to an enlargement 73 of the sleeve 65 and engaging the peripheral wall of a recess in the flywheel, the strip being wrapped round the enlargement 73. Thus, rotation of the sleeve 65 in an anti-clockwise direction as shown in FIGURE 4 tends to unwind the strip 71 and increase its frictional grip on the flywheel, so that the latter can be set in rotation by the sleeve without any great degree of slip, whereas, if the rotation of the sleeve is slowed down, the flywheel is able to overrun it without any great degree of drag because the strip 71 is tending to wind up and so is able to slide fairly freely on the wall of the recess.

The cam plate 68 has substantially V-shaped depressions in one surface in which engage balls 74 (FIGURES 2 and 3) located on the end face of the sleeve, the depressions being so oriented that the balls ride up their inclined surfaces during relative rotation of the sleeve 65 and the cam plate. A ball 75 provides a thrust bearing to support the reaction thrust on the sleeve 65, and a pin 76 projecting from the face of the pulley 62 into a notch 77 in the cam plate holds the cam plate against rotation relative to the pulley.

The braking system described in the preceding paragraphs operates in the following manner.

When the vehicle is being driven and the brakes are not applied the flywheel 64 is driven at the same speed of revolution as the pulley 62 and casing 63, the cam plate 68 being driven by the pin 75 and driving the sleeve 65 through the cam balls 74, the sleeve in turn driving the flywheel 64 through the strip 71.

FIGURE 2 shows the sensing device 17 and the valve 22 in the positions they take up under the above-described conditions, and also shows that, under such conditions, the servo-motor diaphragm unit 37, 41, 43 is held by the spring 57 in such a position that an internal shoulder 78 in the cup-shaped member 45 above the shoulder 48 engages the lower end of the valve body 24. There being no pressure in the liquid pressure system, the valve disc 49 is held off its seat by the spring 52, and in turn holds the ball 28 off its seat, so that there is free communication between the liquid pressure master cylinder 12 and the motor cylinders 11, and also between the two chambers 38 and 39 of the servo-motor 36.

Suction is continuously applied to the chamber 39 of the servo-motor 16, but, owing to the free communication between the chambers the absolute pressures remain equal in both of them, and there is no force tending to move the diaphragm unit 37, 41, 43 against the resistance of the spring 57.

If the brakes are applied, pressure is built up in the liquid pressure system and acts on the plunger 34 to overcome the spring 52, seat the valve disc 49, and allow the ball 28 to approach its seat without coming into engagement with it, so that the communication between the master cylinder 12 and the motor cylinders 11 is not interrupted. If the degree of braking applied is sufficient to cause rapid deceleration of the wheels, the pulley 62 and casing 63 are also rapidly decelerated, and the flywheel 64 tends to overrun the pulley and casing, applying rotational drag to the sleeve 65. If the drag applied to the sleeve 65 is sufficient, the said sleeve rotates through a small angle relative to the pulley 62, causing the balls 74 to ride up the cam faces on the cam plate 68 and displace the said plate 68 axially, moving the push rod 69 against the resistance of the spring 70 to unseat the valve closure member 58 as shown in FIGURE 3. Although the small orifice 56 still provides communication between the chambers 38 and 39 of the servo-motor, atmospheric air is admitted to the chamber 38 at a rate substantially greater than the rate at which air can pass from the chamber 38 into the chamber 39, so that air pressure is built up in the chamber 38 to move the diaphragm unit 37, 41, 43, compressing the spring 57 and allowing the ball 28 to seat, thus shutting off the motor cylinders 11 from the master cylinder of the liquid pressure braking system. The plunger 34 continues to move after the ball 28 has become seated, increasing the volume of the part of the system between the said ball and the motor cylinders 11 so as to reduce the pressure in those motor cylinders and relieve the braking.

The pressure acting to apply the rear wheel brakes 10 is thus reduced and the wheels tend to speed up until the speed of the pulley 62 and casing 63 again corresponds to that of the flywheel 64, and the valve 22 is thus allowed to close. The pressures in the two servo-motor chambers then become equalized by passage of air through the orifice 56, the pressure in the rear brake motor cylinders is restored, and the valve ball 28 is unseated.

Thus, if strong braking is maintained, the brakes 10 on the rear wheels are alternately applied and released, the release taking place, due to suitable calibration of the system, before the wheels are locked and commence to skid.

If the flywheel 64 is caused to turn relative to the pully 62 and casing 63 when the brakes are not applied, for example due to application to the transmission system or removal from the transmission system of deflection due to torque loads when the clutch through which the drive is transmitted is engaged or released, then, although the valve closure member 58 may be temporarily unseated, no pressure difference can be built up across the servo-motor diaphragm unit 37, 41, 43 because the valve disc 49 remains off its seat and there is free communication between the servo-motor chambers 38 and 39. Consequently, the brakes remain continuously operable under these conditions.

Figure 5:
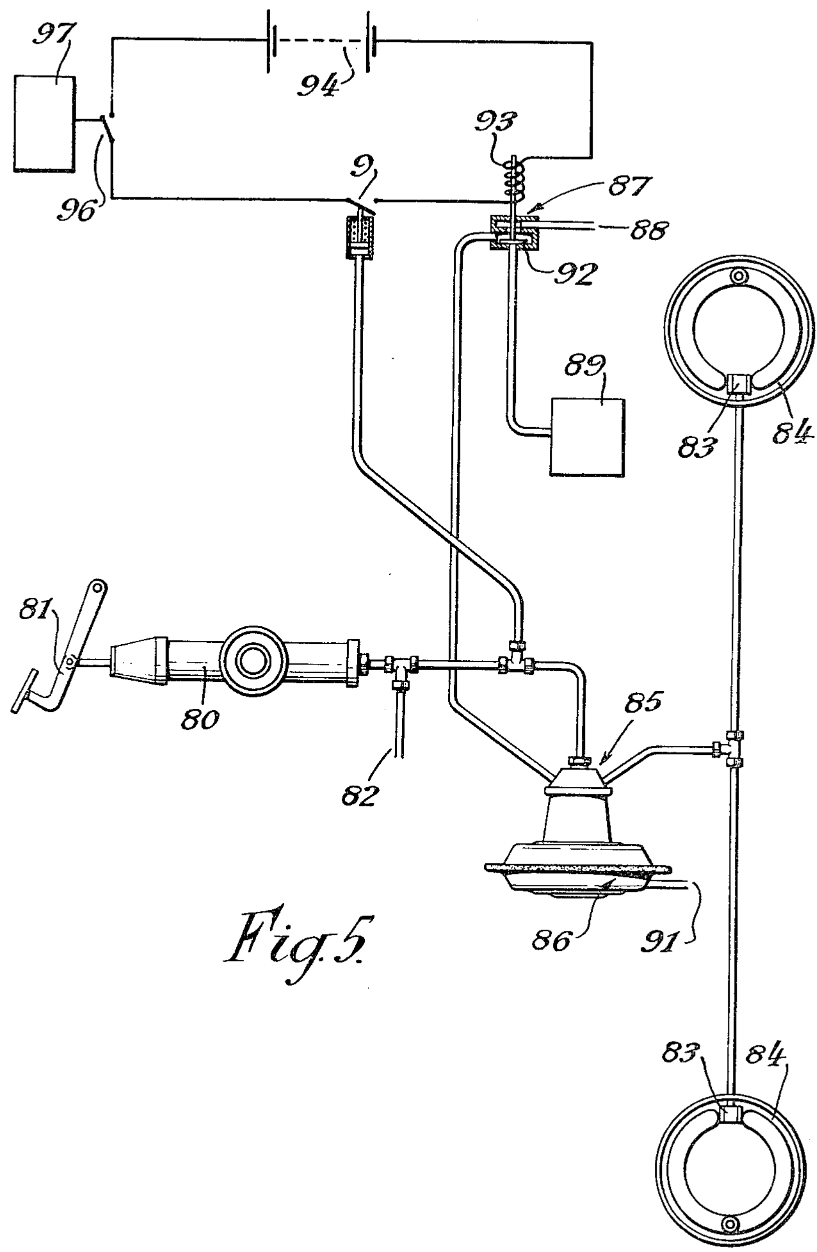
FIGURE 5 is a general view similar to FIGURE 1 showing a modified layout of a braking system.

FIGURE 5 shows a modification of the invention in which the isolation of the motor cylinders operating the rear wheel brakes from the master cylinder when the brakes are not applied is prevented by inhibiting the flow of atmospheric air to the servo-motor instead of by providing free communication between the two chambers of the latter, and the valve means inhibiting the flow are controlled electro-magnetically.

A master cylinder 80, operated by a pedal 81, supplies liquid under pressure to motor cylinders (not shown) actuating front wheel brakes of a vehicle through a conduit 82, and to motor cylinders 83 actuating rear wheel brakes 84 through a valve 85 corresponding to the valve 15 shown in FIGURE 1 and controlled by a similar servo-motor 86, the servo motor, however, differing in that there is no communication between the chambers on opposite sides of the diaphragm except for a restricted orifice corresponding to the orifice 56. A valve 87 serves to connect the chamber of the servo-motor 86 in which a higher pressure is required to operate the valve 85 either to atmosphere at 88 or to a source of compressed air 89, the other chamber of the servo-motor being connected to the atmosphere at 91. The valve 87 has a head 92 normally held by a spring (not shown) on a seat to close the connection to the source of compressed air 89, a solenoid acting on the said head moving it, when energized, to close the connection to atmosphere and open that to the compressed air source. The winding 93 of the solenoid is included in an electrical circuit which also includes a source of electric current 94, a switch 95 closed by pressure in the liquid pressure master cylinder 80, and a further switch 96 closed by a sensing device 97 which may correspond to that shown at 17 in FIGURES 1 to 3, or may take any other suitable form.

Thus operation of the servo-motor to isolate from the master cylinder the motor cylinders for operating the rear wheel brakes of the vehicle is dependent on the closing of both switches 95 and 96, and can take place only when the application of the brakes has already been initiated.

If the servo-motor is connected at 91 to a source of suction and the valve 87 is similarly connected at 88 to a source of suction, then the other connection of the valve 87 may be to the atmosphere instead of to a compressed air supply such as 89.

FIGURE 6 shows a form of compressed air operated servo-motor for operating a valve corresponding to the valve 15 of the arrangement shown in FIGURE 1, but in which the operation of the servo-motor when there is no pressure in the braking system is prevented by inhibiting the admission of compressed air to the servo-motor.

The servo-motor comprises a casing 98 in which is movable a plunger 99 of slightly smaller diameter than the interior of the said casing, a diaphragm 101 having its outer peripheral edge clamped to the casing and its inner peripheral edge clamped to the plunger whilst its intermediate portion lies partly against the wall of the casing and partly against the peripheral surface of the plunger and rolls from one surface to the other as the plunger moves to and fro in the casing. A valve device 102 corresponding to the valve 15 is mounted on one end wall of the casing 98, the plunger 103 of the said valve device engaging with a disc-like valve head 104 mounted in a recess 105 in the plunger 99 and urged by a spring 106 towards the said end wall of the casing 98. A strong spring 107, corresponding to the spring 57 in FIGURES 2 and 3, urges the plunger 99 towards the said end wall. The bore in which the plunger 103 slides is enlarged at 107 adjacent its end which opens into the casing 98, and the compressed air to actuate the servo-motor is admitted to the enlarged bore 107 through a passage 108. The valve head 104 is formed with an annular groove to receive a deformable ring 109 adapted to engage with seating rims 111 and 112 around the enlarged bore 107 and on the end of the plunger 103 respectively, and a stem 113 carrying the valve head 104 is formed with an axial passage 114 opening in the centre of the valve head within the area surrounded by the deformable ring 9. The servo-motor plunger 99 is guided on a fluted pin 115 which slides in a tubular stem carried by the plunger, and the chamber defined between the plunger 99 and the end of the casting 98 remote from the valve unit has an orifice 116 communicating with the atmosphere.

The sensing device of the braking system controls a valve similar to that shown at 87 in FIGURE 5, by which the passage 108 is normally connected to the atmosphere, but is connected to a source of compressed air when the sensing device is operated. If the brakes are not applied, the compressed air can act only on the very small area of the valve head 104 between the seating rims 111 and 112, and the valve head is not moved, the spring 106 being strong enough to resist the thrust due to the pressure acting on this small area. If, however, the brakes are applied, liquid pressure acts on the plunger 103 to unseat the valve head 104 from the seat rim 111, and if, under these conditions, the sensing device operates to admit compressed air to the passage 108, the said compressed air can flow into the servo-motor casing and displace the plunger 99 to cause closure of the valve 102 and increase of the volume of the part of the liquid pressure system including the brake motor cylinders by movement of the plunger 103. Movement of the plungers 103 and 99 continues until the liquid pressure acting on the former falls so low that it no longer follows the plunger 99 and the valve head 104 moves away from it, opening the passage 114 connecting the two chambers of the servo-motor. No further build up of the pressure differential can then take place, and the plunger 99 remains in the position at which the valve head 104 disengaged the plunger 103, so that there is very little delay in its return movement under the load of the spring 107 when the relief of braking allows the wheels to speed up and the sensing device goes out of action.

The valve head 104 when moved into the recess 105 by liquid pressure in the braking system, engages a sealing washer 117 in the said recess to prevent leakage of air around the stem 113.

I claim:

1. A liquid braking system of the hydrostatic type wherein there is provided a master cylinder and a brake operating motor cylinder with a brake operated by said motor cylinder, a servo device including a housing, diaphragm means in said housing dividing it into a high pressure and a lower pressure chamber, a cup shaped member disposed centrally of said diaphragm means, a liquid chamber disposed centrally of said cup member, a first conduit in communication with said master cylinder and liquid chamber, a second conduit in communication with said liquid chamber and motor cylinder, a non-return valve adjacent said liquid chamber for cutting off communication between said first conduit and master cylinder and said second conduit and motor cylinder, a slidable plunger in said liquid chamber adapted to unseat said valve, said cup member being disposed to actuate said plunger to maintain said valve unseated, biasing means normally urging said cup member against said plunger, a by-pass valve in said diaphragm means in communication with said high and low pressure chambers, and by-pass valve biasing means normally maintaining said by-pass valve open when said braking system is in a non-braking application, said plunger being disposed to close said by-pass valve when liquid pressure in said first conduit and liquid chamber increases above a predetermined value due to a braking application, and a sensing device operatively connected to said high pressure chamber to supply air under pressure thereto when the deceleration of a wheel exceeds a predetermined rate.

2. The system of claim 1 wherein said by-pass valve comprises a disc with a valve stem extending through said cup member, and stop means are provided on said stem.

3. The system of claim 2 wherein said by-pass biasing means is a spring mounted over said stem and between said disc and cup member.

4. A liquid braking system of the hydrostatic type wherein there is provided a master cylinder and a brake operating motor cylinder with a brake operated by said motor cylinder, a servo device including a housing with a relatively flat portion and an elongated central portion extending upwardly from said flat portion, a diaphragm with a first cup member and a second cup member dividing the interior of the flat and elongated portions into a high and a low pressure chamber, a valve body with an elongated central liquid chamber disposed in said second cup member, a first conduit in communication with said master cylinder and the top of said liquid chamber, a valve seat in the top of said liquid chamber, a non-return valve disposed on said seat, a second conduit in communication with said liquid chamber below said valve seat and said motor cylinder for cuttng off communication between said cylinders, a slidable plunger in said liquid chamber with a reduced stem for unseating said non-return valve, a by-pass valve disc with a valve stem extending through the bottom of said second cup member, a valve opening in said second cup member, stop means on said by-pass stem, a spring mounted over said by-pass stem and bearing against said disc and second cup member to keep said high and low pressure chambers in communication with each other via said valve opening, biasing means urging said diaphragm and second cup member upwardly, said valve disc located in alignment with said plunger to contact it and normally maintain said non-return valve open when there is no brake application, said plunger being disposed to seat said valve disc to close said valve opening when liquid pressure in said first conduit and liquid chamber increases above a predetermined value upon a braking application, and a sensing device operatively connected to said high pressure chamber to supply air thereto when the deceleration of a vehicle wheel exceeds a predetermined rate.

References Cited by the Examiner

UNITED STATES PATENTS

| | | | |
|---|---|---|---|
| 3,022,114 | 2/1962 | Sampietro ---------- | 303—21 |
| 3,093,422 | 6/1963 | Packer et al. --------- | 303—21 |
| 3,099,499 | 7/1963 | Parshall ----------- | 303—21 |

EUGENE G. BOTZ, *Primary Examiner.*